United States Patent
Ngomssu et al.

(10) Patent No.: US 10,099,670 B2
(45) Date of Patent: Oct. 16, 2018

(54) VEHICLE BRAKING SYSTEM AND METHOD

(71) Applicant: Robert Bosch GmbH, Stuttgart (DE)

(72) Inventors: Emmanuel Kouemo Ngomssu, Canton, MI (US); Bernhard Maier, Flein (DE); Marko Flinner, Boxberg (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 15/378,908

(22) Filed: Dec. 14, 2016

(65) Prior Publication Data
US 2018/0162336 A1  Jun. 14, 2018

(51) Int. Cl.
| | |
|---|---|
| *B60T 8/44* | (2006.01) |
| *B60T 13/14* | (2006.01) |
| *B60T 7/04* | (2006.01) |
| *B60T 8/40* | (2006.01) |
| *B60T 13/68* | (2006.01) |
| *B60T 13/16* | (2006.01) |
| *B60T 13/66* | (2006.01) |

(52) U.S. Cl.
CPC ........... *B60T 13/143* (2013.01); *B60T 7/042* (2013.01); *B60T 8/4081* (2013.01); *B60T 13/162* (2013.01); *B60T 13/662* (2013.01); *B60T 13/686* (2013.01)

(58) Field of Classification Search
CPC .......... B60T 8/268; B60T 8/367; B60T 8/441; B60T 8/442; B60T 13/588; B60T 13/686; B60T 13/745
USPC ..................... 303/114.1; 60/545, 547.1, 593; 701/70–72
See application file for complete search history.

(56) References Cited

U.S. PATENT DOCUMENTS

| | | | | |
|---|---|---|---|---|
| 4,699,436 A | * | 10/1987 | Klein ...................... | B60T 8/268 303/114.1 |
| 6,183,049 B1 | * | 2/2001 | Oka ...................... | B60T 13/686 303/114.1 |
| 6,347,842 B1 | * | 2/2002 | Isono ...................... | B60T 8/367 188/356 |

(Continued)

FOREIGN PATENT DOCUMENTS

| | | |
|---|---|---|
| CN | 205086893 U | 3/2016 |
| DE | 4438722 A1 | 5/1996 |

(Continued)

*Primary Examiner* — Christopher P Schwartz
(74) *Attorney, Agent, or Firm* — Michael Best & Friedrich LLP

(57) ABSTRACT

A vehicle braking system includes a brake pedal, a master cylinder, and an electronically-controlled booster having an input member and an output member adapted to provide an input force to the master cylinder that combines a driver-supplied input force and a boost force provided by the electronically-controlled booster. A wheel cylinder is fluidly coupled to an outlet of the master cylinder and operable to provide a wheel braking force proportional to the input force to the master cylinder. A pump is operable to pump fluid toward the wheel cylinder to provide an assisting wheel braking force. A controller is programmed to trigger a hydraulic braking assist routine in which the pump is activated to provide the assisting wheel braking force. The controller is programmed to reduce the boost force provided by the electronically-controlled booster during the hydraulic braking assist routine.

18 Claims, 2 Drawing Sheets

(56) References Cited

U.S. PATENT DOCUMENTS

| | | | |
|---|---|---|---|
| 6,349,995 B1 | 2/2002 | Itoh et al. | |
| 6,652,040 B2 | 11/2003 | Oka et al. | |
| 7,104,612 B2 | 9/2006 | Terazawa et al. | |
| 7,219,966 B2 | 5/2007 | Young | |
| 7,357,465 B2 | 4/2008 | Young et al. | |
| 7,425,042 B2 | 9/2008 | Fujiwara et al. | |
| 8,459,753 B2 | 6/2013 | Vollert et al. | |
| 8,899,696 B2 | 12/2014 | Weiberle et al. | |
| 9,126,575 B2 | 9/2015 | Kamiya et al. | |
| 9,254,827 B2 | 2/2016 | Weiberle et al. | |
| 2001/0035677 A1 | 11/2001 | Schafer et al. | |
| 2004/0050045 A1* | 3/2004 | Bishop | B60T 13/588 60/545 |
| 2005/0046272 A1 | 3/2005 | Rieth et al. | |
| 2005/0162008 A1 | 7/2005 | Bickel et al. | |
| 2006/0071544 A1 | 4/2006 | Young | |
| 2006/0186733 A1 | 8/2006 | Drumm | |
| 2007/0024110 A1* | 2/2007 | Isono | B60T 8/441 303/114.3 |
| 2008/0255732 A1* | 10/2008 | Yasui | B60T 8/442 701/48 |
| 2009/0045672 A1 | 2/2009 | Nishino et al. | |
| 2010/0244549 A1* | 9/2010 | Koshimizu | B60T 7/042 303/14 |
| 2012/0198959 A1 | 8/2012 | Leiber et al. | |
| 2014/0095044 A1* | 4/2014 | Kikawa | B60T 17/221 701/70 |
| 2014/0167493 A1 | 6/2014 | Kuhlman | |
| 2014/0167494 A1 | 6/2014 | Jeon | |
| 2014/0306513 A1* | 10/2014 | Cunningham | B60T 8/17 303/4 |
| 2015/0314765 A1* | 11/2015 | Maruo | B60T 8/4081 303/10 |
| 2015/0344012 A1 | 12/2015 | Knechtges | |
| 2016/0200309 A1* | 7/2016 | Svensson | B60T 13/686 303/15 |
| 2016/0339890 A1* | 11/2016 | Cann | B60T 13/745 |

FOREIGN PATENT DOCUMENTS

| | | |
|---|---|---|
| EP | 2871102 A1 | 5/2015 |
| WO | 2009003835 A2 | 1/2009 |

* cited by examiner

VEHICLE BRAKING SYSTEM AND METHOD

BACKGROUND

The present disclosure relates to vehicle braking systems. In particular, the invention relates to a vehicle braking system including an electronically-controlled booster and a method of controlling the electronically-controlled booster during operation of the vehicle braking system.

SUMMARY

In one aspect, the invention provides a vehicle braking system includes a brake pedal, a master cylinder, and an electronically-controlled booster having an input member coupled to the brake pedal and having an output member coupled to the master cylinder and adapted to provide an input force to the master cylinder that combines a driver-supplied input force provided by the input member and a boost force provided by the electronically-controlled booster. A wheel cylinder is fluidly coupled to an outlet of the master cylinder and operable to provide a wheel braking force proportional to the input force to the master cylinder. A pump is operable to pump fluid toward the wheel cylinder to provide an assisting wheel braking force. A controller is programmed to trigger a hydraulic braking assist routine in which the pump is activated to provide the assisting wheel braking force while in fluid communication between the master cylinder outlet and the wheel cylinder. The controller is programmed to reduce the boost force provided by the electronically-controlled booster during the hydraulic braking assist routine.

In another aspect, the invention provides a method of operating a vehicle braking system. An electronically-controlled booster is provided having an input rod coupled to a brake pedal and having an output rod coupled to a master cylinder. A driver input supplied by the brake pedal to the booster input rod is sensed. A boost force is provided from the electronically-controlled booster to supplement a force supplied by the driver input so that the force supplied by the driver input and the boost force combine to produce a total output force applied by the booster output rod to the master cylinder. The total output force is conveyed through hydraulic fluid from the master cylinder to at least one wheel cylinder to providing a vehicle braking force. The driver input to the brake pedal is identified as an emergency braking demand. A pump is actuated to provide an assisting wheel braking force to the at least one wheel cylinder in response to identifying the emergency braking demand. The electronically-controlled booster is actuated to reduce the boost force during actuation of the pump to provide the assisting wheel braking force.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
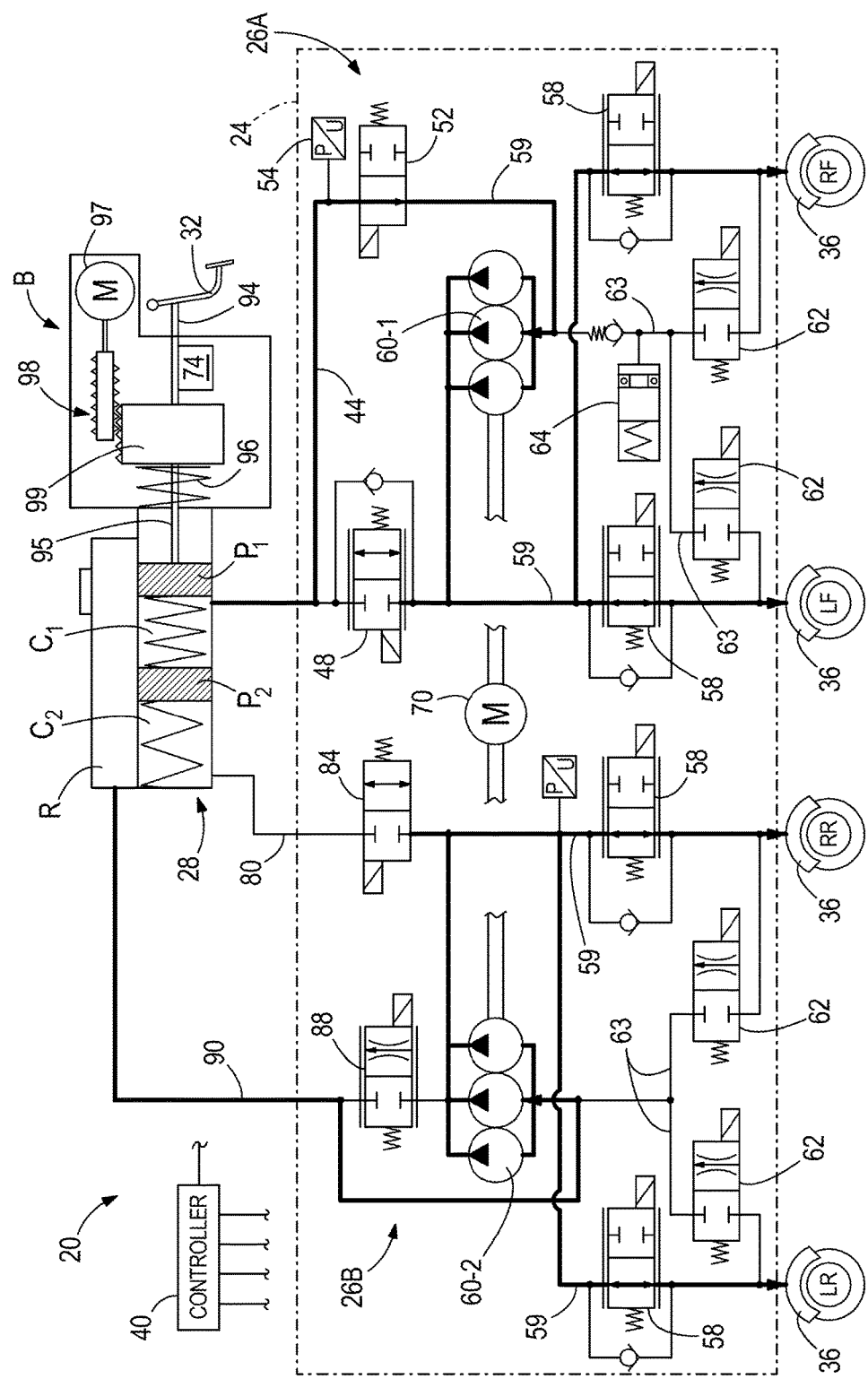
FIG. 1 is a schematic view of a vehicle braking system according to one embodiment of the invention.

A vehicle braking system 20 is illustrated in FIG. 1. The braking system 20 is provided in a wheeled vehicle and is capable of anti-lock braking functionality for preventing wheel lockup and skidding under hard braking events or braking on low friction surfaces. The braking system 20 includes a plurality of independent hydraulic braking circuits 26A, 26B between a master cylinder 28 and a plurality of wheel cylinders 36. As discussed in further detail below, the master cylinder 28 can be actuated by a user-operable brake pedal 32 in conjunction with a booster B. The braking circuits 26A, 26B are physically provided in a hydraulic unit 24. In the illustrated construction, the braking circuits 26A, 26B provide a front/rear split and include a first or primary circuit 26A coupled to the front wheels LF, RF and a second or secondary circuit 26B coupled to the rear wheels LR, RR. Although the wheel cylinders 36 are shown in FIG. 1 as being incorporated with calipers of a disc braking system, other types of hydraulic braking systems may be provided at each of the wheels. The hydraulic braking circuits may control the selective relief of hydraulic fluid pressure from the wheel cylinders 36 so that a braking force below the traction limit is maintained. A plurality of sensors are coupled to a controller 40 of the braking system 20 to provide input information, including wheel speeds, pedal travel, circuit fluid pressure, etc. so that the controller 40 can control the operation of the hydraulic unit 24. The hydraulic unit 24 may also be configured to provide brake force distribution and/or traction control as part of an overall electronic stability program (ESP) of the vehicle since many of the same hardware components are already provided by the braking system 20. Although the hydraulic unit 24 can be used in automotive braking systems with anti-lock and other functionality, its application is not limited to such systems.

As shown in FIG. 1, the primary hydraulic braking circuit 26A includes an inlet line 44 (an output line from a primary outlet of the master cylinder 28) in fluid communication with an outlet of a primary chamber $C_1$ of the master cylinder 28 (FIG. 4). The inlet line 44 is in communication with a pilot valve 48 (e.g., a normally-open, electromagnetically controlled 2-position valve), a high pressure switching valve 52 (e.g., a normally-closed electromagnetically controlled 2-position valve), and a pressure sensor 54. The outlet of the pilot valve 48 is coupled to both of the front wheel cylinders 36 through respective inlet valves 58 (e.g., normally-open electromagnetically controlled 2-position valves) on parallel pressure lines 59. Each of the front wheel cylinders 36 is also coupled to a suction side of a pump 60-1 via a respective outlet valve 62 (e.g., a normally-closed electromagnetically controlled multi-position valve) on parallel relief lines 63. The pump 60-1 can include one or a plurality of pump elements (e.g., three elements). The outlet valves 62 can be controlled between a variety of open positions by the controller 40 to bleed off pressure from the wheel cylinders 36 that is deemed excessive or likely to exceed the traction limit. An accumulator 64 (e.g., a low-pressure accumulator) is coupled in parallel between the outlet valves 62 and the pump 60-1 and configured to receive and temporarily store fluid from the outlet valve(s) 62 prior to being removed and returned by the pump 60-1. The pump 60-1 is driven by a motor 70. The motor 70, along with the booster B, and all the electronically-controlled valves of the primary and secondary circuits 26A, 26B can be electrically coupled to the controller 40.

The secondary hydraulic braking circuit 26B includes an inlet line 80 (an output line from a secondary output of the master cylinder 28) in fluid communication with an outlet of a secondary chamber $C_2$ of the master cylinder 28 (FIG. 4). The inlet line 80 is fluidly separated from the inlet line 44, so that the primary and secondary circuits 26A, 26B can provide separate, independent braking to each respective set of wheel cylinders (which are separated as front axle and rear axle in the illustrated construction). The inlet line 80 is in communication with a separation valve 84 (e.g., a normally-open, electromagnetically controlled 2-position valve). The outlet of the separation valve 84 is coupled to both of the rear wheel cylinders 36 through respective inlet valves 58 (e.g., normally-open electromagnetically controlled 2-position valves) on parallel pressure lines 59. Each of the rear wheel cylinders 36 is also coupled to a suction side of a pump 60-2 via a respective outlet valve 62 (e.g., a normally-closed electromagnetically controlled multi-position valve) on parallel relief lines 63. The pump 60-2 can include one or a plurality of pump elements (e.g., three elements). The outlet valves 62 can be controlled between a variety of open positions by the controller 40 to bleed off pressure from the wheel cylinders 36 that is deemed excessive or likely to exceed the traction limit. The pump 60-2 is driven by the motor 70 (e.g., jointly driven with the pump 60-1 of the primary braking circuit 26A). The pressure side of the pump 60-2 is coupled to a reservoir R of the master cylinder 28 through a pressure control regulator valve 88 (e.g., a normally-closed electromagnetically controlled multi-position valve) on a return line 90.

Turning now to the master cylinder 28, each of the chambers $C_1$, $C_2$ is a variable volume chamber as controlled by respective first and second pistons $P_1$, $P_2$. The brake pedal 32 actuates the first piston $P_1$ through the booster B, which is an electronically-controlled booster as described below. The second piston $P_2$ is a floating piston, which is actuated only indirectly by movement of the first piston $P_1$. The brake pedal 32 is coupled to a rod 94, referred to herein as the booster input rod, that serves as an input member to the booster B, the coupling being direct without any intermediate booster therebetween. The first piston $P_1$ is coupled to a rod 95, referred to herein as the booster output rod, that serves as an output member of the booster B so that the first piston $P_1$ is moved with movement of the booster output rod 95. The booster B is configured such that, under a threshold or "cut-in" force, a force from actuation of the brake pedal 32 is transferred to the booster output rod 95 and the first piston $P_1$ without additional boost force, and above the cut-in force, the force on the booster output rod 95 from actuation of the brake pedal 32 makes up only fraction of the total force transferred to the booster output rod 95 and the first piston $P_1$ as the booster B provides the remainder. To apply booster-assisted braking, a stroke amount of the brake pedal 32 or the booster input rod 94 is detected by the pedal travel sensor 74 and reported to the controller 40. A corresponding controller output is sent to the booster B to apply a force to the output rod 95 to be added to the driver-supplied force of the booster input rod 94 from the brake pedal 32. During normal operation, or a primary operational mode of the vehicle braking system 20, the booster B actively assists the driver in generating fluid pressure within the master cylinder 28 to achieve a target braking force at the wheel cylinders 36 and thus, achieve a target vehicle deceleration rate proportional to the driver-exerted force. The booster B may operate according to a predetermined algorithm to achieve a predetermined boost factor, defined by the total force output from the booster B to the master cylinder in relation to the driver-supplied force.

Figure 2:
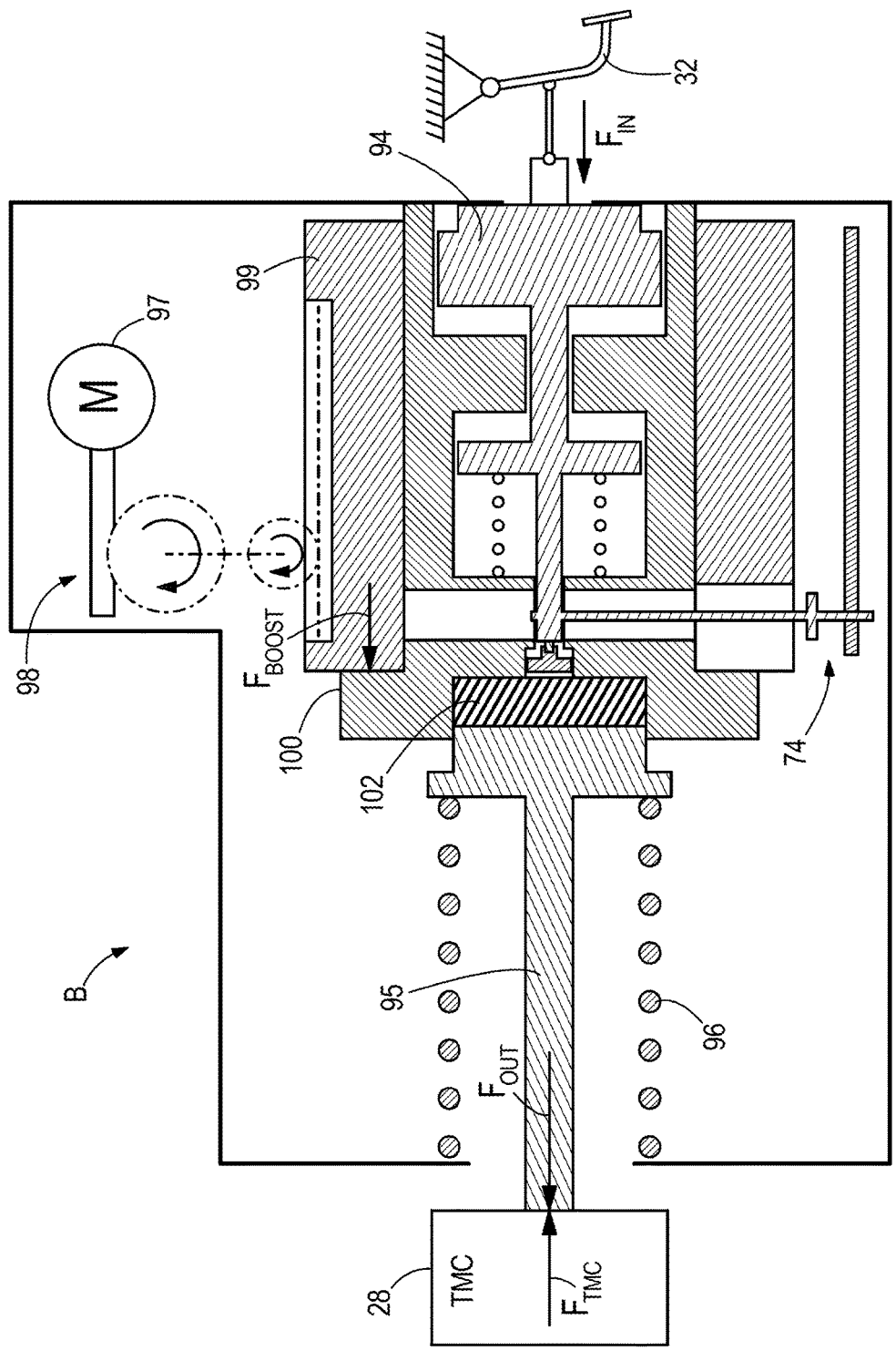
FIG. 2 is a schematic view of an electronically-controlled booster, operatively coupled between a brake pedal and a master cylinder of the vehicle braking system of FIG. 1.

As shown in FIG. 1 and in further detail in FIG. 2, the booster B can be an electromechanical booster, including a booster motor 97, a transmission device 98, and a boost body 99 drivable by the booster motor 97 through the transmission device 98. The boost body 99 is coupled to the booster output rod 95. As shown in FIG. 2, the boost body 99 can be coupled to the output rod 95 through a valve body 100 and an elastomeric reaction disc 102. In the illustrated construction, the transmission device 98 includes a drive screw coupled to the output of the booster motor 97 and external threads formed on the boost body 99, but other arrangements are optional. A return spring 96 biases the booster output rod 95, and thus the boost body 99, away from the master cylinder 28. A cut-in spring 104 biases the booster input rod 94 away from the valve body 100 to an initial or home position when the booster input rod 94 is not actuated by the brake pedal 32. In the normal mode of operation, deformation of the cut-in spring 104 allows the booster input rod 94 to contact the center portion of the elastomeric reaction disc 102, which in turn, transmits force to the booster output rod 95. Meanwhile, an outer peripheral portion of the elastomeric reaction disc 102 is actuated by the valve body 100, which is driven by the booster motor 97 through the boost body 99. The controller 40 can be programmed so that the movement of the valve body 100 follows or tracks the movement of the booster input rod 94. Thus, the boost factor of the booster B can be defined by the ratio of actuation areas of the reaction disc 102. In a back-up or failsafe mode of operation in which the booster B is not operable to assist in actuating the master cylinder 28, the booster input rod 94 abuts with the valve body 100 and at least partially actuates the booster output rod 95 through the valve body 100.

As described below, the controller 40 can be programmed to control the booster B to adjust the ratio of brake pedal-applied force to booster-applied force (i.e., reducing the booster-applied force) during a braking assist routine, such that a change in pedal reaction force is not perceptible to the driver even when a substantial pressure drop occurs in the first master cylinder chamber $C_1$. When the brake pedal 32 is actuated by the driver, the controller 40 determines how far the brake pedal 32 is actuated and also how quickly the input was supplied to the brake pedal 32. These values can be determined from observing the position or travel of booster input rod 94 with the pedal travel sensor 74, as the brake pedal 32 and the booster input rod 94 have a predetermined kinematic relationship. The controller 40 may also consider other inputs or factors including, but not limited to, fluid pressure within the master cylinder 28 or the circuits 26A, 26B, or collision avoidance sensors provided on the vehicle. Based on some or all of these inputs, the controller 40 is programmed to identify the need for and trigger the implementation of a hydraulic braking assist routine whereby the pump 60-1 is operated while in fluid communication with the master cylinder chamber $C_1$ and the respective wheel cylinders 36 of the first circuit 26A. In one aspect, the hydraulic braking assist routine can be triggered in the case where the controller 40 identifies the driver's braking request as a request for emergency braking, while further identifying that the driver's input is not sufficient, even with boost, to achieve maximum brake force and deceleration. Thus, the hydraulic braking assist routine assists the normal braking by actuating the pump 60-1 to achieve maximum brake force and deceleration. In some constructions, the controller 40 may calculate whether or not the output from the booster B to the master cylinder 28 is capable of triggering anti-lock braking operation, and when the controller 40 determines that it will not, the controller 40 may enact the hydraulic braking assist routine to put the vehicle braking system 20 into anti-lock braking operation. In other constructions, the hydraulic braking assist routine may be triggered when the braking system 20 experiences "fade" (i.e., reduced mutual friction of the brake linings due to overheating), during which a reduction in braking torque is experienced in relation to a given master cylinder pressure or wheel cylinder force.

When the pump 60-1 is operated during the hydraulic braking assist routine, fluid is drawn to the suction side of the pump 60-1 from the master cylinder chamber $C_1$ since the pump 60-1 of the first circuit 26A does not have a direct connection to the fluid reservoir R. Thus, the hydraulic braking assist routine leads to a reduction in fluid pressure within the chamber $C_1$, which in turn leads to a reduction in a reaction force $F_{TMC}$ applied from the fluid inside the master cylinder 28 to the booster output rod 95. The booster output rod 95 may also advance further into the master cylinder 28 as fluid is evacuated by the pump 60-1 for supply to the wheel cylinders 36. The opposing force $F_{OUT}$ applied by the booster output rod 95 also drops in response to the hydraulic braking assist routine. Without countermeasures, this results in the reaction force from the booster input rod 94 to the brake pedal 32 (a force equal and opposite to input force $F_{IN}$ of FIG. 2) dropping suddenly, which gives the driver the impression that they are not braking or that they are losing contact to the brake pedal 32. Some drivers may also have the impression that the brake assist remains active although they are not braking. In order to accommodate the necessary reduction in the forces $F_{TMC}$, $F_{OUT}$ between the master cylinder 28 and the booster output rod 95, without a corresponding reduction in the input force $F_{IN}$ and the corresponding reaction force to the brake pedal 32, the controller 40 is programmed to reduce the boost force $F_{BOOST}$.

The boost force reduction can be calculated to correspond to the pressure drop within the master cylinder 28 so that the hydraulic braking assist routine is imperceptible to the driver as they maintain depression of the brake pedal 32. As such, the relative fraction of total output force $F_{OUT}$ that is driver-supplied actually increases. By making the driver more responsible for the total output to the master cylinder, via boost reduction, the hydraulic braking assist routine may manipulate the fluid pressure in the circuit 26A, even while the brake pedal remains coupled to the circuit 26A, without affecting the feel of the brake pedal 32. This can yield improved driver confidence and satisfaction during the hydraulic braking assist routine and the overall driving experience. The controller 40 may be programmed to perform boost force reduction proportional to master cylinder pressure reduction, within a predetermined range or threshold so that there is a finite limit or cap to the amount that the boost force can be reduced during the hydraulic braking assist routine. The limit can ensure that the booster B does not actuate against the driver input to the brake pedal 32 under any circumstance.

Various features and advantages of the disclosure are set forth in the following claims.

What is claimed is:

1. A vehicle braking system comprising:
    a brake pedal;
    a master cylinder;
    an electronically-controlled booster having an input member coupled to the brake pedal and having an output member coupled to the master cylinder and adapted to provide an input force to the master cylinder that combines a driver-supplied input force provided by the input member and a boost force provided by the electronically-controlled booster;
    a wheel cylinder fluidly coupled to an outlet of the master cylinder and operable to provide a wheel braking force proportional to the input force to the master cylinder;
    a pump having a suction side coupled to the outlet of the master cylinder, the pump operable to pump fluid in a direction from the master cylinder outlet toward the wheel cylinder to provide an assisting wheel braking force; and
    a controller programmed to trigger a hydraulic braking assist routine in which the pump is activated to provide the assisting wheel braking force while in fluid communication between the master cylinder outlet and the wheel cylinder,
    wherein the controller is programmed to reduce the boost force provided by the electronically-controlled booster during the hydraulic braking assist routine.

2. The vehicle braking system of claim 1, wherein the controller is programmed to trigger the braking assist routine when identifying that:
    based on one or both of the speed and amount of actuation of the brake pedal, emergency braking is being requested, and
    the input force to the master cylinder is not sufficient to maximize deceleration.

3. The vehicle braking system of claim 1, wherein the output member of the electronically-controlled booster is coupled to a boost body drivable by an electric motor for receiving the boost force.

4. The vehicle braking system of claim 3, wherein the boost body is arranged concentrically about a valve body in which the input member is slidably received.

5. The vehicle braking system of claim 1, wherein the electronically-controlled booster includes an elastomeric reaction disc through which both the boost force and the driver-supplied input force are applied to the output member.

6. The vehicle braking system of claim 1, wherein the wheel cylinder is coupled to a first chamber of the master cylinder by a first fluid circuit, the vehicle braking system further comprising at least one additional wheel cylinder coupled to a second chamber of the master cylinder by a second fluid circuit.

7. The vehicle braking system of claim 6, wherein the pump is a first pump, and wherein the second fluid circuit includes a second pump having a suction side coupled to a fluid reservoir.

8. The vehicle braking system of claim 1, wherein the controller is programmed to initiate the reduction in boost force simultaneously with initiation of the hydraulic braking assist routine.

9. The vehicle braking system of claim 1, wherein the controller is programmed to reduce the boost force proportional to a reduction in fluid pressure resulting from actuation of the pump during the hydraulic braking assist routine.

10. The vehicle braking system of claim 1, wherein the input member of the electronically-controlled booster is directly coupled to the brake pedal without any intermediate booster.

11. A method of operating a vehicle braking system, the method comprising:

providing an electronically-controlled booster having an input rod coupled to a brake pedal and having an output rod coupled to a master cylinder;

sensing a driver input supplied by the brake pedal to the booster input rod;

providing a boost force from the electronically-controlled booster to supplement a force supplied by the driver input so that the force supplied by the driver input and the boost force combine to produce a total output force applied by the booster output rod to the master cylinder;

conveying the total output force through hydraulic fluid from the master cylinder to at least one wheel cylinder to providing a vehicle braking force;

identifying the driver input to the brake pedal as an emergency braking demand;

actuating a pump to provide an assisting wheel braking force to the at least one wheel cylinder in response to identifying the emergency braking demand, wherein the pump has a suction side coupled to an outlet of the master cylinder, the pump operating to deliver brake fluid in a direction from the master cylinder outlet toward the at least one wheel cylinder; and actuating the electronically-controlled booster to reduce the boost force during actuation of the pump to provide the assisting wheel braking force.

12. The method of claim 11, wherein the driver input is supplied by the brake pedal to the booster input rod without any intermediate booster.

13. The method of claim 11, wherein the driver input to the brake pedal is identified as an emergency braking demand by one or both of amount of brake pedal depression and speed of brake pedal application.

14. The method of claim 11, further comprising maintaining a consistent pedal reaction force at the booster input rod equal to the force supplied by the driver input throughout the actuation of the pump despite a drop in fluid pressure within the master cylinder.

15. The method of claim 14, wherein the boost force is reduced by an amount proportional to the drop in fluid pressure within the master cylinder.

16. The method of claim 11, wherein the reduction in the boost force is initiated simultaneously with an initiation of the pump actuation.

17. The method of claim 11, wherein the total braking force at the at least one wheel cylinder is increased during the simultaneous pump actuation and boost force reduction.

18. The method of claim 11, further comprising limiting the reduction in the boost force to a predetermined maximum amount to guarantee that the electronically-controlled booster does not actuate against the driver input.

* * * * *